(12) United States Patent
Van Rensburg

(10) Patent No.: US 9,749,386 B1
(45) Date of Patent: Aug. 29, 2017

(54) BEHAVIOR-DRIVEN SERVICE QUALITY MANAGER

(71) Applicant: RINGCENTRAL, INC., Belmont, CA (US)

(72) Inventor: Christopher Van Rensburg, Foster City, CA (US)

(73) Assignee: RingCentral, Inc, Belmont, CA (US)

(*) Notice: Subject to any disclaimer, the term of this patent is extended or adjusted under 35 U.S.C. 154(b) by 0 days.

(21) Appl. No.: 15/018,116

(22) Filed: Feb. 8, 2016

(51) Int. Cl.
*H04L 12/26* (2006.01)
*H04L 12/24* (2006.01)
*H04L 29/06* (2006.01)

(52) U.S. Cl.
CPC .................... *H04L 65/80* (2013.01)

(58) Field of Classification Search
CPC . H04L 41/5067; H04L 69/02; H04L 41/2003; H04L 43/10; H04L 41/5003; H04L 67/14; H04L 69/24; H04W 24/02; H04W 24/08; H04W 64/00; G06F 17/30312
See application file for complete search history.

(56) References Cited

U.S. PATENT DOCUMENTS

| | | | |
|---|---|---|---|
| 8,046,462 B2 | 10/2011 | Trappeniers et al. | |
| 2005/0060365 A1* | 3/2005 | Robinson | H04L 69/329 709/203 |
| 2012/0278134 A1* | 11/2012 | Papay | G06Q 10/06375 705/7.37 |
| 2013/0152002 A1* | 6/2013 | Menczel | G06F 3/0488 715/765 |
| 2013/0198397 A1* | 8/2013 | Zhang | H04W 4/001 709/228 |
| 2013/0325924 A1* | 12/2013 | Moshfeghi | H04L 43/0817 709/203 |
| 2014/0274147 A1* | 9/2014 | Kennedy | H04W 64/00 455/456.3 |
| 2015/0131453 A1* | 5/2015 | Tofighbakhsh | H04W 52/0251 370/241 |
| 2015/0154492 A1* | 6/2015 | Ponomarev | G06N 3/004 706/11 |
| 2015/0326461 A1* | 11/2015 | Singh | H04L 43/12 709/221 |

* cited by examiner

*Primary Examiner* — Abdullahi E Salad
(74) *Attorney, Agent, or Firm* — Finnegan, Henderson, Farabow, Garrett & Dunner LLP

(57) ABSTRACT

A method and system for improving communications is disclosed. For example, the method for improving communications includes using a user device having one or more sensors. Monitoring, using one or more of the sensors, for information reflecting a user-drive behavior associated with a communications session. Determining, using a triggering parameter analyzer, from the monitored information whether the user-driven indicator directs an improvement in a quality of service associated with the communications session. Transmitting to a communications system a request to improve the quality of service associated with the communications session based on the determination.

20 Claims, 5 Drawing Sheets

BEHAVIOR-DRIVEN SERVICE QUALITY MANAGER

TECHNICAL FIELD

The present disclosure relates to the field of communication devices and systems and, more particularly, to methods, devices and systems for managing the quality of service of communications sessions by monitoring triggering parameters, specifically user behavior and contextual cues.

BACKGROUND

During a communications session users sometimes have trouble receiving the content being transmitted during the communications session. For example, users may not be able to fully hear or understand another user or prompts from an Interactive Voice Response (IVR) system during a communications session because, for example, of a characteristic associated with the quality of service of the session. Previously, if the quality of service provided in a communications session met general standards, as measured for example by Perceptual Evaluation of Speech Quality (PESQ), no effort was made to improve the quality of service. But this meant users had no ability to improve the quality of service of the communications session and improve intelligibility of the communications session.

SUMMARY

In one disclosed embodiment, a method for improving communications comprises monitoring, using one or more of the sensors of a user device, for information reflecting at least one user-driven indicator associated with a communications session; determining, using a triggering parameter analyzer, from the monitored information whether the user-driven indicator directs an improvement in a quality of service associated with the communications session; and transmitting to a communications system a request to improve the quality of service associated with the communications session based on the determination.

In another disclosed embodiment, a user device comprises, at least one or more sensors where one or more of the sensors is configured to monitor for at least one user-driven indicator associated with a communications session; and a processor in communication with the one or more sensors and a triggering parameter analyzer, where the processor is configured to: determine from the at least one user-driven indicator whether an improvement in a quality of service associated with the communications session is required, and transmit a request to improve the quality of service associated with the communications session based on the determination to a communications system.

BRIEF DESCRIPTION OF THE DRAWINGS

The accompanying drawings, which are incorporated in and constitute part of this disclosure, together with the description, illustrate and serve to explain the principles of various example embodiments.

DETAILED DESCRIPTION

Figure 1:
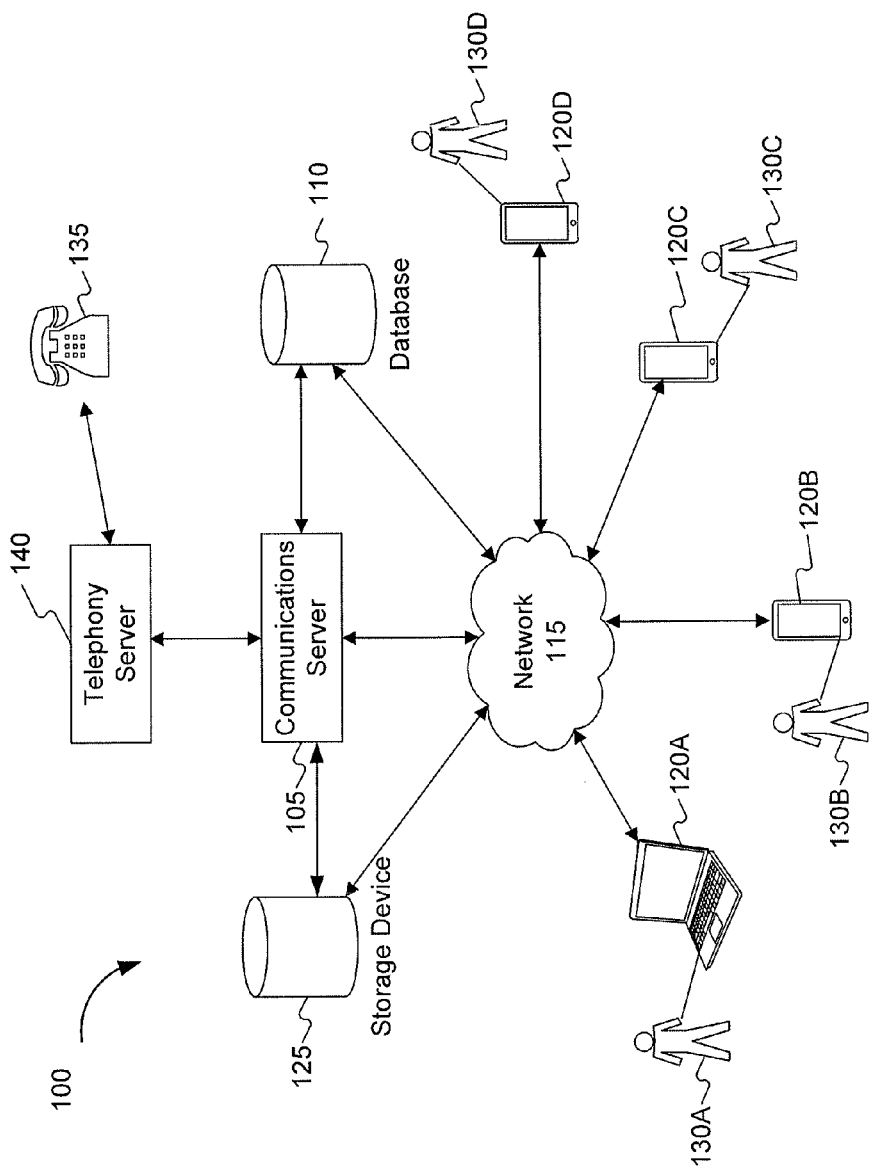
FIG. 1 is a diagram of an example of a communications system in which various implementations described herein may be practiced.

Reference will now be made in detail to the example embodiments implemented according to the present disclosure, the examples of which are illustrated in the accompanying drawings. Wherever possible, the same reference numbers will be used throughout the drawings to refer to the same or like parts.

Example embodiments of the present disclosure provide methods, devices, and systems for managing quality of service of calls, such as telephone calls, within a communications session. Telephone calls include landline calls, cellular wireless calls, and voice over IP (VoIP) calls, web browser call (e.g. using the WebRTC protocol), etc. Below, for convenience, telephone calls are used as example calls, although the same or similar disclosure may also be applied to other types of calls, such as video and/or audio calls using audio/video applications.

The embodiments herein include computer-implemented methods, tangible non-transitory computer-readable mediums, and systems. The computer-implemented methods can be executed, for example, by at least one processor that receives instructions from a non-transitory computer-readable storage medium. Similarly, systems and devices consistent with the present disclosure can include at least one processor and memory, and the memory can be a non-transitory computer-readable storage medium. As used herein, a non-transitory computer-readable storage medium refers to any type of physical memory on which information or data readable by at least one processor can be stored. Examples include random access memory (RAM), read-only memory (ROM), volatile memory, nonvolatile memory, hard drives, CD ROMs, DVDs, flash drives, disks, and any other known physical storage medium. Singular terms, such as "memory" and "computer-readable storage medium," can additionally refer to multiple structures, such as a plurality of memories or computer-readable storage mediums. As referred to herein, a "memory" can comprise any type of computer-readable storage medium unless otherwise specified. A computer-readable storage medium can store instructions for execution by at least one processor, including instructions for causing the processor to perform steps or stages consistent with an embodiment herein. Additionally, one or more computer-readable storage mediums can be utilized in implementing a computer-implemented method. The term "computer-readable storage medium" should be understood to include tangible items and exclude carrier waves and transient signals.

The disclosed methods and systems are implemented in desktop and/or mobile environments. In the desktop and/or mobile environments, the disclosed communication methods and systems are implemented as a stand-alone application or software, or are implemented within a web browser, such as a WebRTC-based environment.

The present disclosure arises out of the realization that conventional communications systems do not enable a triggering parameter analyzer to manage the quality of service (QoS) of a call (e.g., a telephone call) in response to triggered parameters monitored during the call. This results in calls that have sub-optimal quality of service (QoS), which hinders users' ability to effectively communicate on calls. The disclosed methods and systems enable a triggering parameter analyzer to manage the quality of service of a call in real-time by analyzing triggered parameters present during the call. Thus, efficiency of calls is improved and thereby operation costs are reduced due to more efficient communication.

FIG. 1 shows an example of a communications system 100 in which various implementations as described herein may be practiced. Communications system 100 represents, for example, an environment that allows users (e.g., 130A-130D) (collectively users 130) using associated user devices (e.g., 120A-120D) (collectively user devices 120) to engage in communications sessions, such as a VoIP call, a land-line telephone call, a wireless cellular phone call, online audio/video conferencing, etc. Communications system 100 reflects a system that allows users 130 to interact with other user devices 120, a communications server 105, a network 115, and a telephony server 140. In some examples, the communications system 100 is configured to allow the user devices 120 and/or communications server 105 to alter the quality of service of a communications session or direct the communications system 100 to alter the quality of service in response to a quality of service deficiency. For example, the communications system 100 may alter the quality of service by changing communications parameters such as network conditions.

As shown in FIG. 1, communications system 100 includes a communications server 105, a database 110, a network 115, one or more user devices 120A-120D, and a storage device 125. The example components and arrangements shown in FIG. 1 are not intended to limit the disclosed embodiments, as the system components used to implement the disclosed processes and features may vary. For example, communications system 100 may include multiple communications servers 105, and each communications server 105 may host a certain type of communication service, e.g., instant messaging (IM), VoIP, audio/video conferencing, such that various types of multimedia services may be provided to user devices 120.

Communications server 105 is configured to provide or assist in providing communication services, such as, text-based, audio-based, and/or video-based communications, etc., to user devices 120. Communications server 105 may include a computer-based system including computer system components, desktop computers, workstations, tablets, hand-held computing devices, memory devices, and/or internal network(s) connecting the components. Communications server 105 is configured to receive triggering parameters, such as a user behavior or a contextual cue, from user devices 120 over network 115, process the parameters, store the parameters, and/or transmit the parameters to the database 110, the storage device 125 or the telephony server 140 over network 115. Communications server 105 includes both hardware and software components, such as a memory, a processor, computer instructions or code.

Network 115 facilitates communications and sharing of content between user devices 120 and at least one of the communications server 105, the database 110, the storage device 125, and the telephony server 140. Network 115 may be any type of network that provides electronic communications, exchanges information, and/or facilitates the exchange of information between various components such as communications server 105, database 110, user devices 120, storage device 125, and telephony server 140. For example, network 115 can be the Internet, a Local Area Network, a cellular network, a public switched telephone network ("PSTN"), or other suitable connection(s) that enables communications system 100 to send and receive information between the components of communications system 100. Network 115 supports a variety of messaging formats, and a variety of services and applications for user devices 120. A network similar to network 115 may connect communications server 105 and telephony server 140.

Figure 2:
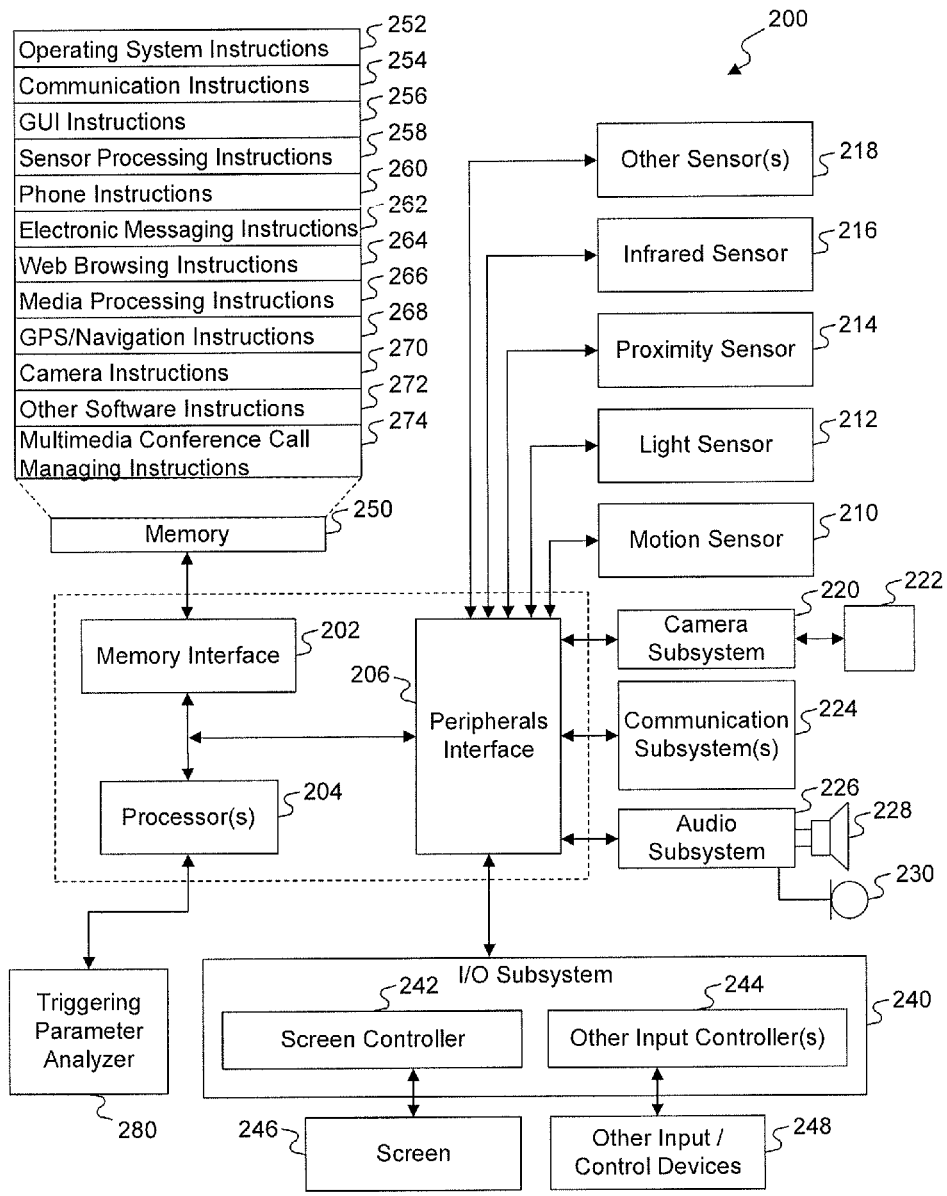
FIG. 2 illustrates example components of a user device for implementing embodiments consistent with the present disclosure.

In some embodiments, communications system 100 includes at least one of a database 110 and a storage device 125. Database 110 and/or storage device 125 have one or more physical or virtual storages in communication with communications server 105, directly or through network 115. For example, database 110 and/or storage device 125 include hard disks, flash drives, memory, magnetic drives, optical discs, or the like, for storing data. Database 110 and/or storage device 125 store, for example, any triggering parameters sent by the user devices 120 to triggering parameter analyzer 280, as shown in FIG. 2. Database 110 and/or storage device 125 also store communication content, for example messages exchanged between participants, documents and/or files shared by various participants, communication history, audio and/or video messages, voicemails, etc., of ongoing or prior communications sessions. Database 110 and/or storage device 125 also store text, audio and/or video messages, documents, files, images, or shared content among communication users 130. Storage device 125 and/or database 110 may store user profiles of users 130 of the user devices 120, such as, for example, a medical condition, a disability, a preferred language, a quality of service preference, past quality of service improvements, or other types of profile information.

Data stored in database 110 and/or storage device 125 may be transmitted to communications server 105 and/or user devices 120 before, after, or during a communications session. In some embodiments, database 110 and/or storage device 125 reside in a cloud-based server that is accessible by communications server 105 and/or user devices 120 through network 115. While database 110 and/or storage device 125 are illustrated as external devices connected to communications server 105, in some embodiments, database 110 also resides within communications server 105 as internal components of communications server 105.

Communications system 100 includes a telephony server 140. The telephony server 140 includes both hardware and software components, such as a memory, a processor, computer instructions or code. Telephony server 140 is connected to a telephone 135 through the PSTN (not shown). A set of telephones 135 may be included in the telephone network and connected to telephony server 140. Telephony server 140 is also connected with one or more user devices 120 through the telephone network. When a user of telephone 135 or a user device (e.g., one of user devices 120) initiates a telephone call to communications system 100, the telephone call is processed by the telephony network 140. Telephony server 140 directs or routes the telephone call in communications system 100. Telephony server 140 includes various hardware and software components known in the art to direct or route the call.

As shown in FIG. 1, users 130 communicate with one another using various types of user devices 120 during communications sessions. User devices 120 can be a television, tablet, computer monitor, video conferencing console, laptop computer, cellular phone, smartphone, wearable device, gaming console, or the like, with electronic communications capability. User devices 120 may include a speaker and microphone that facilitate audio calls. In some examples, user devices 120 include a screen for displaying data or may be operatively connected with an external display for displaying data. User devices 120 may also include video input devices such as a video camera, web camera, or the like. User devices 120 include one or more software applications configured to enable the user devices 120 to engage in electronic communications, such as sending and/or receiving electronic messages, VoIP calls, audio and/or video calls or conferences, with one another in one or multiple communications sessions. In some embodiments, communications system 100 also includes devices without display or video capture capabilities, such as smart phones 120B, 120C or 120D, or a telephone 135.

FIG. 2 illustrates example components of an example user device 200 for use in communications system 100. User device 200 implements computer programs, applications, methods, processes, or other software to perform embodiments described in the present disclosure. As shown in FIG. 2, user device 200 includes a memory interface 202, one or more processors 204 such as data processors, image processors and/or central processing units, and a peripherals interface 206. Memory interface 202, one or more processors 204, and/or peripherals interface 206 may be separate components or may be integrated in one or more integrated circuits. The various components in user device 200 are coupled by one or more communication buses or signal lines.

Sensors, devices, and subsystems are coupled to peripherals interface 206 to facilitate multiple functionalities. For example, a motion sensor 210, a light sensor 212, a proximity sensor 214 and an infrared sensor 216 are coupled to peripherals interface 206. Motion sensor 210 is configured to detect a motion (e.g., acceleration) and/or an orientation of user device 200. For example, motion sensor 210 may be used to detect the user 130 angling and/or positioning a user device 200 closer to a user's 130 ear, which may be used to improve quality of service in response to a user. Light sensor 212 is configured to sense an amount of light, which may be used to adjust the brightness of a screen of user device 200. Light sensor 212 may also be configured to detect distance of an object from the user device 200 by measuring an amount of light. The detected distance may indicate that a user 130 is positioning the user device 200 close to their head because they cannot hear well during the communications session and the quality of service may be adjusted in response. Proximity sensor 214 is configured to detect a distance between user device 200 and an object other than the user device 200. For example, the distance measurement may be used to measure the distance of the user device 200 from the user 130, which is then used to improve quality of service. Similarly, infrared sensor 216 is configured to detect a distance between user device 200 and an object other than the user device 200, such as between the user 130 and the user device 200. The measured distance may indicate that the user 130 cannot hear well or clearly understand the communications session and that a quality of service improvement may be appropriate or required. An increase in the measured distance may indicate that the volume of the communications session spiked due to a quality of service issue that needs to be resolved.

Other sensors 218 are connected to peripherals interface 206, such as a positioning system (e.g., GPS receiver), a temperature sensor, a biometric sensor, a gyroscope, a radar sensor, a pressure sensor, and/or other sensing devices, to facilitate related sensing functionalities, for example distance of user device 200 from the user 130 and orientation of the user device 200 to the user 130. As a further example, a radar sensor may be used to detect minute movements of a user 130, such as hand motions or head motions, or changes in orientation or positioning of the user device 200 relative to the user 130. For example, a head movement of a user 130 could include the user tilting their head closer to the user device 200. Such a movement could indicate that the user 130 cannot hear the communications session and requires a quality of service improvement to improve the intelligibility of the communications session. A GPS receiver may be integrated with, or connected to, user device 200. For example, a GPS receiver may be built into mobile telephones, such as smartphone devices. GPS software allows mobile telephones to use an internal or external GPS receiver (e.g., connecting via a serial port or Bluetooth). A camera subsystem 220 and an optical sensor 222 (e.g., a charged coupled device (CCD) or a complementary metal-oxide semiconductor (CMOS) optical sensor), are utilized to facilitate camera functions, such as recording photographs and video clips. The camera subsystem 220 may also be utilized to measure triggering parameters such as the distance between the user 130 and the user device 200.

Communication functions are facilitated through one or more communication subsystems 224, which may be wired or wireless communication subsystems. For example, communication subsystem(s) 224 include an Ethernet port, radio frequency receivers and transmitters, WiFi or cellular wireless transceivers, and/or optical (e.g., infrared) receivers and transmitters. The specific design and implementation of the wireless/wired communication subsystem(s) 224 depends on the communication network(s) over which user device 200 is intended to operate. For example, in some embodiments, user device 200 includes wireless/wired communication subsystem(s) 224 designed to operate over a GSM network, a GPRS network, an EDGE network, a Wi-Fi or WiMax network, and a Bluetooth® network.

Communication subsystem(s) 224 also include a subsystem for handling audio/video calls. The subsystem for handling calls includes a native dialer that includes a circuit and a software application configured to provide telephony services such as PSTN or VoIP calls. The native dialer, for example, enables a user 130 of user device 200 to dial a phone number to initiate a call, and to receive and handle a call (e.g., answer the call, reject the call, hold the call, forward the call, divert the call to voice mail, conference multiple calls, etc.). The native dialer includes a software application, which is displayed as an interface when a call is received, on screen 246 to alert the user of user device 200 of the incoming call. The interface includes one or more selectable elements for receiving user inputs. For example, the one or more elements include an element for answering a call, an element for rejecting or ignoring a call, an element for forwarding a call, an element for diverting a call to voice mail, an element for holding a call, and an element for conferencing multiple calls, etc. The native dialer may be part of the operating system 252 of the user device 200, or a standalone application such as a desktop client application or mobile application.

An audio subsystem 226 is coupled to a speaker 228 and a microphone 230 to facilitate voice-enabled functions, such as voice recognition, voice replication, digital recording, and telephony functions. The audio subsystem 226 may also capture or detect triggering parameters, such as user speech, as discussed in detail in the description of method 400. For example, the audio subsystem 226 may detect trigger phrases such as "Can you repeat that?" or "Can you speak louder?" during the communications session. The audio subsystem 226 and triggering parameter analyzer 280 may also be configured to determine the language of the communications session as discussed in detail in the description of method 400.

The I/O subsystem 240 includes a screen controller 242 and/or other input controller(s) 244. The screen controller 242 is coupled to a screen 246. Screen 246 is a touch screen or a non-touch screen, such as a CRT or LCD, LED non-touch screen. When screen 246 is a touch screen, screen 246 and screen controller 242 are configured to, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with screen 246. Screen 246 is used to implement virtual or soft buttons and/or a keyboard. In some embodiments, touch screen 246 is configured to receive user input, such as touching, tapping, double tapping, pressing, holding, swiping, dragging and dropping, clicking, double clicking, etc. Screen 246 can also measure for triggering parameters, for example, by detecting if a user 130 is pressing the screen 246 close to their face during a conversation.

The other input controller(s) 244 is coupled to other input/control devices 248, such as one or more buttons, rocker switches, thumb-wheel, infrared port, USB port, and/or a pointer device such as a stylus.

Memory interface 202 is coupled to a memory 250. Memory 250 includes high-speed random access memory and/or non-volatile memory, such as one or more magnetic disk storage devices, one or more optical storage devices, and/or flash memory (e.g., NAND, NOR). Memory 250 stores an operating system 252, such as DRAWIN, RTXC, LINUX, iOS, UNIX, OS X, WINDOWS, or an embedded operating system such as VXWorkS. The operating system 252 includes instructions for handling basic system services and for performing hardware dependent tasks. In some implementations, operating system 252 is a kernel (e.g., UNIX kernel).

Memory 250 is configured to store communication instructions 254 to facilitate communicating with one or more additional devices, one or more computers and/or one or more servers. Memory 250 includes graphical user interface (GUI) instructions 256 to facilitate graphic user interface processing; sensor processing instructions 258 to facilitate sensor-related processing and functions; phone instructions 260 to facilitate phone-related processes and functions; electronic messaging instructions 262 to facilitate electronic-messaging related processes and functions; web browsing instructions 264 to facilitate web browsing-related processes and functions; media processing instructions 266 to facilitate media processing-related processes and functions; GPS/navigation instructions 268 to facilitate GPS and navigation-related processes and instructions; camera instructions 270 to facilitate camera-related processes and functions; and/or other software instructions 272 to facilitate other processes and functions. Memory 250 also includes multimedia conference call managing instructions 274 to facilitate conference call related processes and instructions.

In some embodiments, communication instructions 254 include software applications, such as a desktop client application, a mobile application, a desktop web browser, and a mobile web browser, to facilitate connection with communications server 105. Graphical user interface (GUI) instructions 256 include a software program that facilitates a user 130 associated with user device 200 to receive communication content from communications server 105, provide user input, and so on. Graphical user interface instructions 256 include a software program that facilitates a user associated with the user device 200 to provide a user input, such as selection of one of a plurality of selectable elements displayed on a screen, to instruct user device 200 to handle a call (e.g., to answer, reject, forward a call, or divert the call to voice mail).

The phone instructions 260 include instructions to the native dialer provided within communication subsystems 224 of user device 200 for handling phone calls. For example, phone instructions include instructions, which when executed by processor 204, cause screen 246 to display an interface including one or more elements for receiving user inputs that instruct the native dialer how to handle the calls. The phone instructions include instructions corresponding to the various elements of the interface for handling the call.

The identified instructions and applications correspond to a set of instructions for performing one or more functions described above. These instructions need not be implemented as separate software programs, procedures, or modules. In some embodiments, memory 250 includes additional instructions or fewer instructions. Furthermore, various functions of user device 200 are implemented in hardware and/or in software, including in one or more signal processing and/or application specific integrated circuits.

Figure 4:
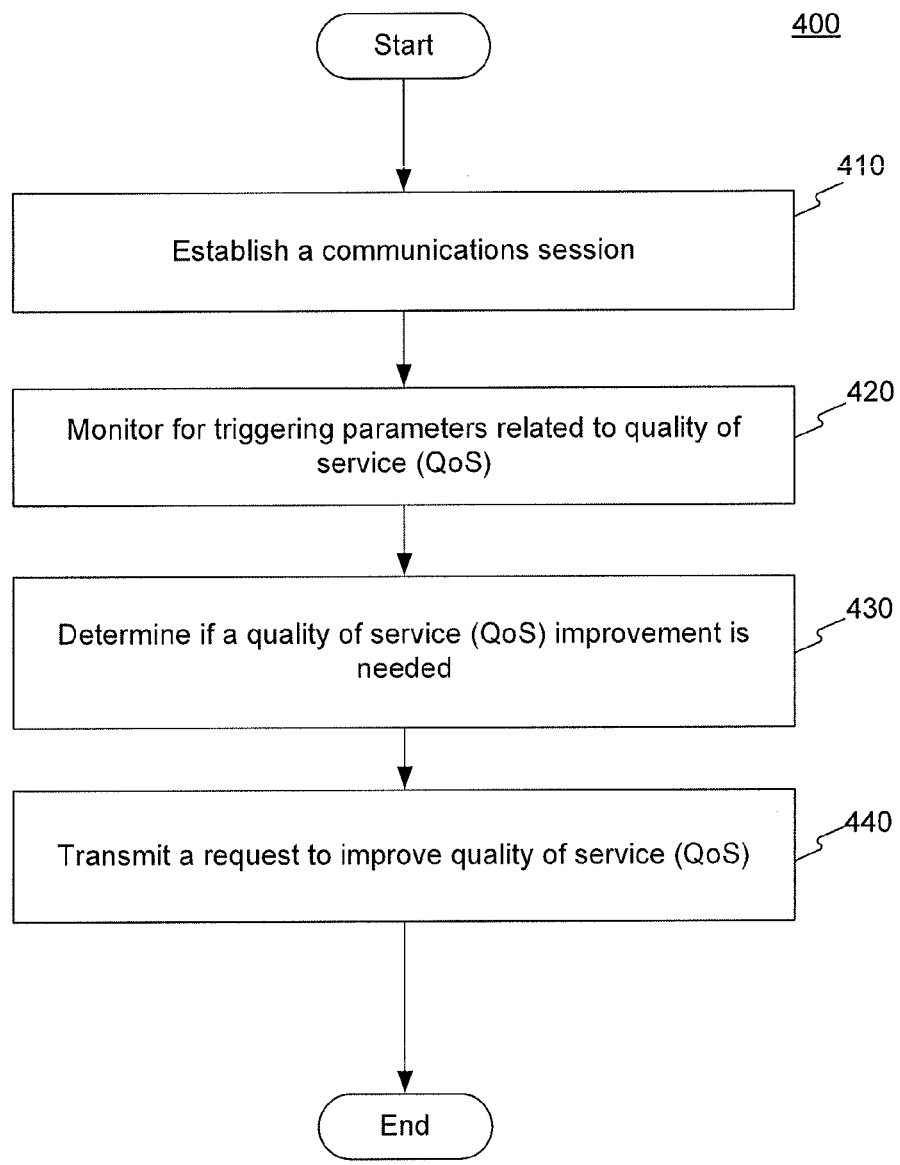
FIG. 4 is a flowchart of an example process for managing quality of service of a communications session.

The processor(s) 204 is coupled to a triggering parameter analyzer 280. Triggering parameter analyzer 280 includes both hardware and software components, such as a memory, a processor, computer instructions, or code. As shown, triggering parameter analyzer 280 is separate from processor (s) 204, though in some embodiments it may not be so configured. Triggering parameter analyzer 280 makes quality of service determinations based on at least one triggering parameter detected during a communications session and to alter the quality of service or direct the quality of service to be altered in response to the at least one triggering parameter. The triggering parameter analyzer 280 is connected to the communications system 100 through the user devices 120 and network 115. The triggering parameter analyzer 280 can correlate triggering parameters and quality of service improvements, store the correlations, and use the correlations to identify quality of service improvements as explained more fully in step 520 of method 500 below. FIG. 4 details a flowchart of the process for managing the quality of service of a communications session.

Figure 3:
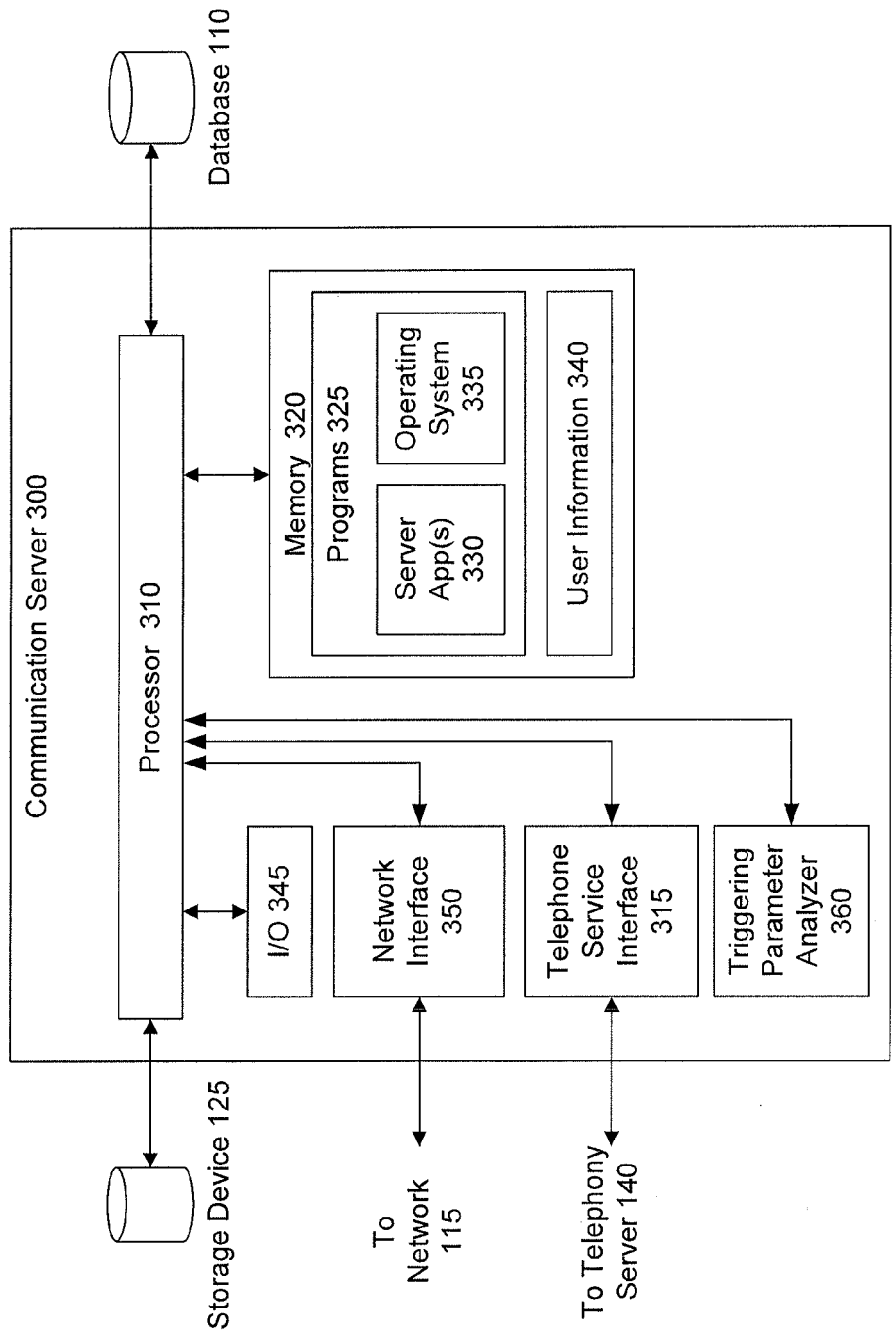
FIG. 3 is a diagram of an example communications server, in accordance with the disclosed embodiments.

FIG. 3 shows a diagram of an example communications server 300, consistent with the disclosed embodiments. As shown, communications server 300 includes one or more processors 310, a telephone service interface 315, and a memory 320 configured to store programs 325. Programs 325 include server applications (or server apps) 330 and operating system 335. Memory 320 is also configured to store user information 340. Communications server 300 further includes an input/output ("I/O") device 345, a network interface 350 and a triggering parameter analyzer 360. Communications server 300 communicates with database 110 and/or storage device 125 through a suitable communication interface, such as a data communication bus, a wired communication port, and/or a wireless communication transceiver. In some embodiments, database 110 and/or storage device 125 are included within communications server 300. Communications server 300 is a single server or is configured as a distributed computer system including multiple servers, server farms, clouds, or computers that interoperate to perform one or more of the processes and functionalities associated with the disclosed embodiments.

Processor 310 includes one or more processing devices configured to perform functions of the disclosed methods, such as a microprocessor manufactured by Intel™ or manufactured by AMD™. In some embodiments, processor 310 is a single core processor configured with virtual processing technologies. In some embodiments, processor 310 uses logical processors to simultaneously execute and control multiple processes. Processor 310 implements virtual machine technologies, or other technologies to provide the ability to execute, control, run, manipulate, store, etc. multiple software processes, applications, programs, etc. In some embodiments, processor 310 includes a multiple-core processor arrangement (e.g., dual, quad core, etc.) configured to provide parallel processing functionalities to allow communications server 300 to execute multiple processes simultaneously. In some embodiments, other types of processor arrangements are used in processor 310 to provide for the capabilities disclosed herein.

Communications server 300 includes one or more storage devices configured to store information used by processor 310 (or other components) to perform certain functions related to the disclosed embodiments. For example, communications server 300 includes memory 320 that includes instructions to enable communications server 300 to execute one or more applications, such as server apps 330, operating system 335, and any other type of application or software known to be available on computer systems. Alternatively or additionally, the instructions, application programs, etc. are stored in database 110 and/or storage device 125, which are external to communications server 300. In some embodiments, database 110 and/or storage device 125 are included within communications server 300.

Memory 320, database 110, and/or storage device 125 include a volatile or non-volatile, magnetic, semiconductor, tape, optical, removable, non-removable, or other type of storage device or tangible or non-transitory computer-readable medium. Memory 320, storage device 125, and/or database 110 include one or more memory devices that store data and instructions that processor 310 accesses, for example, to perform one or more features of the disclosed embodiments. Memory 320, storage device 125, and/or database 110 also include any combination of one or more databases controlled by memory controller devices (e.g., server(s), etc.) or software, such as document management systems, Microsoft SQL databases, SharePoint databases, Oracle™ databases, Sybase™ databases, or other relational databases.

In some embodiments, memory 320 is a volatile or non-volatile, magnetic, semiconductor, tape, optical, removable, non-removable, or other type of storage device or tangible or non-transitory computer-readable medium that stores one or more program(s) 325 such as server apps 330 and operating system 335, and user information 340. Common forms of non-transitory media include, for example, a flash drive a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same.

Programs 325 include one or more software modules causing communications server 300 to perform one or more functions of the disclosed embodiments. Moreover, communications server 300 executes one or more programs located remotely from one or more components of communications system 100. For example, communications server 300 accesses one or more remote programs that, when executed, perform functions related to disclosed example embodiments.

Server app(s) 330 cause communications server 300 to perform one or more functions of the disclosed example embodiments. For example, server app(s) 330 may cause communications server 300 to establish a communications session among users 130. Server app(s) 330 may also cause communications server 300 to provide an interface to the communications session to enable one or more users 130 (shown in FIG. 1) of the communications session to alter the quality of service of the communications session through triggering parameters. In some embodiments, other components of the communications system 100 are configured to perform one or more functions of the disclosed methods. For example, user devices 120 are configured to receive a user input relating to a triggering parameter. The user devices 120 may receive user input by monitoring for triggering parameters using sensors (e.g. 210, 212, 214, 216, and 218). The user device 120 may also monitor for triggering parameters using other components (e.g. 220, 226, 246 and 248).

In some embodiments, program(s) 325 include(s) operating system 335 performing operating system functions when executed by one or more processors such as the processor 310. By way of example, operating system 335 includes Microsoft Windows™, Unix™, Linux™, Apple™ operating systems, or other types of operating systems. Accordingly, disclosed embodiments may operate and function with computer systems running any type of operating system 335. Communication server 300 also includes software that, when executed by processor 310, provides communications with network 115 through a network interface 350 and/or a direct connection to one or more user devices 120.

In some embodiments, user information 340 includes, for example, user profiles. User profiles may each include, for example, a medical condition, a disability, a preferred language, quality of service preference, past quality of service improvements, or other types of profile information.

Communication server 300 also includes one or more I/O devices 345 having one or more interfaces for receiving signals or input from devices and providing signals or output to one or more devices that allow data to be communicated (received and/or transmitted) by communication server 300. In some embodiments, I/O devices 345 include interface components for interfacing with one or more input devices, such as one or more keyboards, mouse devices, touch screen, USB data ports, and the like, which enable communication server 300 to receive input from a user (e.g., an operator or administrator) of communication server 300.

Network interface 350 includes hardware components and software components that enable communication server 300 to communicate with network 115. In some embodiments, network interface 350 includes a modem, an Ethernet card, an Ethernet cable port, a WiFi transceiver, and/or software including instructions and protocols for communication.

Telephone service interface 315 includes hardware and software components that enable communication server 300 to communicate with a telephone system that includes telephony server 140 (shown in FIG. 1). Telephone service interface 315 enables communication server 300 to receive a telephone call from the telephone system. For example, based on an input received from a user of telephone 135 or any of user devices 120, telephony server 140 initiates a call to a communications session. Communication server 300 receives the call through telephone service interface 315. Telephone service interface 315 is also associated with other devices included in communications system 100, for example, to route, direct, or forward a call to a communications session, and/or to a user device 120.

Triggering parameter analyzer 360 includes both hardware and software components, such as a memory, a processor, computer instructions or code, that enable communications server 300 to make quality of service determinations. Triggering parameter analyzer 360 is configured to make quality of service determinations based on at least one triggering parameter associated with communications sessions and to alter the quality of service or direct the quality of service to be altered in response to the triggering parameter. FIG. 4 details a flowchart of the process for managing the quality of service of a communications session.

FIG. 4 is a flowchart illustrating an example method 400 for managing quality of service of a communications session. Method 400 can be performed by various devices disclosed above. For example, in some embodiments, method 400 is performed by user devices 120 described in FIG. 1. In other embodiments, method 400 is performed by communications server 105 illustrated in FIG. 1.

Method 400 begins by establishing a communications session (step 410). A communications session begins, for example, when a user device 120 receives a request to establish a communications session to initiate a call. For example, in some embodiments, a communications system 100 receives a request to initiate a call, such as a telephone call, from telephony server 140. To send the request, a caller, using telephone 135, dials a telephone number associated with the user device 120, and telephony server 140 initiates and directs the call to communications server 105 if the number associated with the user device 120 is dialed. Then the communications server 105 may connect the user device 120 to the telephony server 140 by interacting with the communications subsystem 224. After the connection between the telephony server 140 and the user device 120 is completed, a communications session is established. Alternatively or additionally, telephony server 140 directs the call to a desktop or mobile software application that is provided with call receiving and handling functions, to a desktop or mobile web browser that is provided with call receiving and handling functions, or to a native dialer provided within the user devices 120.

User device 120 uses sensors to monitor for triggering parameters related to quality of service during the communications session (step 420). The triggering parameters may include a user behavior, a contextual cue or a combination of both. In some embodiments, the user device 120 monitors for triggering parameters with sensors 210, 212, 214, 216, or 218, the camera subsystem 220, the audio subsystem 226 and/or the I/O subsystem 240 as illustrated in FIG. 2. In some embodiments, the communications server 105 may monitor for triggering parameters. For example, the communications server 105 may monitor signals generated by one or more sensors 210, 212, 214, 216, or 218, the camera subsystem 220, the audio subsystem 226 and/or the I/O subsystem 240 of the user device 120 to determine if a triggering parameter presents during a communications session. The user device 120 and/or communications server 105 can simultaneously monitor for many types of triggering parameters. Additionally, the user device 120 and/or communications server 105 can make determinations with the triggering parameter analyzer 280, 360 based on all types of triggering parameters. The user device 120 and/or communications server 105 can utilize any mix of triggering parameters to monitor and determine if a quality of service improvement is necessary and if so, the proper application of the quality of service improvement to the communications session.

In some embodiments, information reflecting a user behavior includes monitoring for a proximity or placement of the user device 120 relative to the user 130. Proximity or placement of the user device 120 relative to the user may include objective indicators such as: a distance of the user device 120 to the user, an orientation of the user device 120 to the user 130, or a contact between the user device 120 and the user 130. For example, the distance may constitute the distance between the user device 120 and a user's ear as measured by one or more sensors such as the motion sensor 210, the proximity sensor 214, the infrared sensor 216 and/or the camera subsystem 220. If a user 130 places the user device 120 close to his or her ear, this could indicate that the user 130 cannot hear well or cannot understand the communications session. In response, a quality of service improvement could be implemented to increase the intelligibility of the communications session. The orientation of the user device 120 may be monitored by other sensors 218 such as a gyroscope, to determine if the user 130 is altering the orientation of the user device 120, such as by angling the phone closer to the user's ear or by angling the microphone 230 of the user device 200 closer to the user's mouth, due to what may be an inability to hear or understand the communications session or be understood, which could be remedied through a quality of service improvement. As a further example, the user device 120 may monitor for contact with the user 130 by utilizing sensors, such as the screen 246, pressure sensor, or infrared sensor 215, to sense whether the user 130 is pressing the user device 120 more firmly against their ear or face. This user behavior might indicate that the user 130 cannot hear the communications session clearly and that a quality of service improvement is necessary.

In some embodiments, information reflecting a user behavior could include monitoring for a user action with the user device 120. A user action with the user device 120 may include objective indicators such as: a change in volume of the user device 120, a user 130 pressing a button on the user device 120 and/or a change in operation of the user device 120, such as by placing the user device 120 on speakerphone. The following examples of user actions could indicate that a user 130 cannot clearly hear or understand the communications session and that a quality of service improvement is necessary. For example, a user 130 increasing the volume, including attempting to increase the volume when the volume is already at the highest level, of the communications session on the user device 120 could indicate that the user 130 cannot clearly hear the communications session. Similarly, a user 130 placing the user device 120 on speakerphone or the user 130 increasing the volume of the user device 120 may indicate that the user 130 is pressing a button on the user device 120, such as the speakerphone button or volume button. A change in operation might include changing the communications session from a video chat to an audio chat, or taking a communications off a speakerphone setting. As a further example, the user action may indicate that the user 130 will experience a cognitive load that will decrease the intelligibility of the communications session. For example, the triggering parameter analyzer 280, 360 may detect that a user 120 is multitasking due to a user interacting with separate programs or applications on the user device 120, such as using a short message service (SMS) application, during a communications session. The triggering parameter analyzer 280, 360 may increase the quality of service of the communications session based on a prediction that the user's 120 focus is divided between the SMS application and listening to the communications session. In this manner, the quality of service improvement may compensate for the cognitive load present due to multitasking.

In some embodiments, information reflecting a user behavior could include monitoring for a characteristic associated with user speech. A detected characteristic associated with user speech may include at least one of: a content of speech, a pace of speech, a volume of speech, a period of time between speech, a repetition of speech, a playback repetition in Interactive Voice Response (IVR) and/or a language of speech. A microphone 230 could be used to detect speech characteristics. For example, a content of speech might be analyzed to determine if the user 130 is having trouble understanding the communications session. In this case, the user device 120 or the communications system 105 would monitor the content of speech for trigger phrases, such as "I can't hear you," "Can you say that again?," "Please repeat that." For example, the trigger phrases could be stored in a library and the detected trigger phrases could be compared to those stored in the library. If the trigger phrases are present in the communications session, the trigger phrases would indicate to the triggering parameter analyzer 280, 360 that the user 130 requires an improvement in quality of service to better understand the communications session. The triggering parameter analyzer 280, 360 may also be configured to determine the language of the communications session so that the content of speech, such as a trigger phrase, can be compared to a library of the same language. For example, the triggering parameter analyzer 280, 360 may have access to multiple libraries of trigger phrases where each library includes trigger phrases in a particular language, such as German, English, Spanish, etc. In operation, for example, the triggering parameter analyzer 280, 360 may determine the language of the trigger phrase and then compare the trigger phrase to the library of the same language. In some embodiments, the library may be stored in the communications server 105, the database 110, the user device 120, and/or the storage device 125.

Pace of speech could indicate, for example, that a slow speaking user 130 either does not understand the communications session or that the user 130 cannot hear the communications session adequately enough to respond. A user 130 responding loudly could indicate, for example, that the communications session has poor quality of service and that the user 130 is attempting to overcome this issue by speaking loudly. As a further example, a long period of time between words or phrases could indicate that the user 130 is having trouble understanding the communications session and does not know how to respond. A user 130 repeating the same phrase might indicate that a communications session is not properly transmitting and that a quality of service increase is necessary. Likewise, repeating playback in IVR could indicate that the user 130 cannot understand the communications session and that the quality of service should be increased. As a further example, the user device 120 may monitor the language the user 130 is speaking to determine if the communications session is in their preferred language, such as the user 130 is an English speaker but the communications session is in Spanish. The triggering parameter analyzer 280, 360 would recognize that the user 130 might have increased difficulty understanding the language of the communications session and therefore, an improvement in quality of service could be beneficial.

In some embodiments, information reflecting a user behavior could include monitoring for an indicator associated with a user. A detected indicator associated with user 130 may include at least one of: a facial expression and/or a biometric parameter. A camera subsystem 220 on a user device 120, such as a visor or e-glasses, may be used to detect a facial expression. The facial expression might be analyzed to determine if the user 130 is having trouble understanding the communications session. Specific facial expressions, such as a frown or a grimace, could indicate that the user 130 is having trouble understanding the communications session and that a quality of service improvement is necessary. A biometric sensor on the user device 120, such as a watch or a health tracking device, may be used to detect biometric parameters. Certain biometric parameters might be analyzed to determine if the user 130 is having trouble understanding the communications session. Biometric parameters may include: heart rate, blood pressure, skin resistance, and/or perspiration. For example, if a user 130 has an increased heart rate they may be experiencing a stress that would make it more difficult to understand the communications session. In this case, the triggering parameter analyzer 280, 360 may increase the quality of service to increase the intelligibility of the communications session.

In some embodiments, information reflecting a contextual cue could include monitoring for an environmental parameter of the communications session. An environmental parameter of the communications session may include at least one of: an ambient audio noise level surrounding the user device 120, and/or a geographic location of the user device 120. A loud ambient noise surrounding the user device 120 could indicate that the user 130 might have a decreased ability to understand a communications session. In response, the triggering parameter analyzer 280, 360 could increase the quality of service to increase the intelligibility of the communications session. The geographic location of the user device 120 could include a further step of determining if there is a special event occurring at the geographic location at the time of the communications session. In this case, the triggering parameter analyzer 280, 360 would monitor the user device to confirm the geographic location of the user device, such as by using the global positioning system (GPS). Next, the geographic location is compared to a calendar of events for that location at the time of the communications session to determine if the user device 120 is present at the geographic location during the time of a special event. For example, the triggering parameter analyzer 280, 360 may determine that a user device 120 is at a sporting event or concert during the communications session and improve the quality of service in response to increase the intelligibility of the communications session.

As a further example, the ambient noise level or geographic location of the user device 120 may indicate that the user 130 will experience a cognitive load that will decrease the intelligibility of the communications session. For example, the triggering parameter analyzer 280, 360 may detect that a user 120 is on a road and that the geographic location of a user 120 is changing rapidly, which may indicate that the user 120 is driving in a vehicle. The triggering parameter analyzer 280, 360 may increase the quality of service of the communications session based on a prediction that the user's 120 focus is divided between driving and listening to the communications session. The quality of service improvement may compensate for the cognitive load present due to driving a vehicle. The quality of service improvement could occur even if the ambient noise level is low, due to a quiet car, in response to the predicted cognitive load created by driving. Compensating for cognitive load also may be applied in response to the user's 120 schedule. For example, the triggering parameter analyzer 280, 360 may access the schedule of a user 130, such as from the user device 120, to determine if the user 130 is in the middle of an activity that would divide their focus, such as a sporting event. In response, the triggering parameter analyzer 280, 360 may increase the quality of service of the communications session based on a predicted cognitive load to increase intelligibility of the communications session. The triggering parameter analyzer 280, 360 may also look to the importance of the scheduled activity when determining a quality of service improvement. For example, the activity may have a deadline that is included in the schedule, which would indicate that the user 130 is dedicating less attention to the communications session and that a quality of service improvement is necessary to lessen the cognitive load on the user 130.

In some embodiments, information reflecting a contextual cue includes monitoring the user device 120 for a user characteristic, for example a user profile. A user profile may include at least one of: an indication of a medical condition, a preferred language, past quality of service improvements, a user impairment, a personal characteristic of the user or other types of profile information. The user profile could be set up prior to the communications session or the triggering parameter analyzer 280, 360 could access the user device 120 to search for a user profile that contains the information. The user profile could be developed from user inputs or user observations made by the communications system 100 and recorded for later use. For example, a medical condition could include a temporary sickness or a permanent disability. The triggering parameter analyzer 280, 360 could take the condition into consideration when determining proper quality of service in a communications session. If a user's preferred language is different than the language in the communications session the triggering parameter analyzer 280, 360 could determine that a quality of service improvement is necessary to help the user 130 better understand the communications session. The triggering parameter analyzer 280, 360 could use past quality of service improvements to better tailor future communications session quality of service to the specific user 130. For example, the past quality of service improvements could indicate that the user 130 requires high quality of service during their morning train commute to overcome the ambient noise of the train. As a further example, an impairment could include: a hearing impairment, a speaking impairment or a vision impairment. In the case of a hearing impairment, if a user 130 is yelling, the triggering parameter analyzer 280, 360 may determine that both an increase in output volume as well as a decrease in microphone sensitivity of the user device 120 is required to increase the intelligibility of the communications session for both the user 130 that is yelling and other user(s) 130 involved in the communications session. For example, the user 130 may be yelling because the other user(s) 130 have a hearing impairment. In that case, the triggering parameter analyzer 280, 360 may decrease the microphone sensitivity of the user device 120 that the user 130 is yelling into and increase the output volume of the user device 120 to the other user(s). Alternatively, the user 130 may be yelling because they have a hearing impairment. In that case, the user device 120 that the user 130 is yelling into may decrease the microphone sensitivity and increase the output volume to account for the yelling user's 130 hearing impairment. A personal characteristic may include a user habit such as placing the user device 120 on speakerphone when commuting to work. In response, the triggering parameter analyzer 280, 360 could increase the quality of service to allow the user 130 to easily understand the communications session.

In some embodiments, information reflecting a contextual cue could include monitoring for a setting on the user device 120. The setting on the user device 120 may include at least one of: a language setting, a volume setting, and/or a speakerphone setting. For example, if the user places the language on the user device 120 in a language that is not being used in the communications session, the triggering parameter analyzer 280, 360 could increase the quality of service to increase intelligibility. For example, the triggering parameter analyzer 280, 360 could search the user device 120 for the volume setting on the user device. The triggering parameter analyzer 280, 360 could use this information, for example, to determine if the user device 120 volume has been set to the maximum. If so, the triggering parameter analyzer 280 could determine if an increase in quality of service is needed to help the user 130 to understand the communications session. Use of the speakerphone on a user device 120 could indicate to the triggering parameter analyzer 280, 360 that the quality of service should be increased or may need to be increased to offset ambient noise. Furthermore, for example, increasing the volume after placing the phone on speakerphone may indicate to the triggering parameter analyzer 280, 360 that a quality of service improvement is necessary.

In some embodiments, information reflecting a contextual cue could include monitoring for a user preference for quality of service, for example a setting indicating a user's 130 preference for quality of service. For example, the user 130 may choose a preference for high quality of service, in which case, the triggering parameter analyzer 280 would request the quality of service be increased to match that setting during a communications session. This preference could be selected prior to the communications session or during the communications session.

As noted herein, the user behavior and/or contextual cues also represent user-driven indicators. User-driven indicators reflect objective criteria that are used to improve quality of service through quality of service improvements. The quality of service improvements necessary are determined based on the user-driven indicators that present during a communications session.

In some embodiments, the monitoring step 420 may be performed continuously during the communications session so that triggering parameters are monitored constantly in real-time. In some embodiments, the monitoring step 420 may also be terminated after a pre-determined period of time if no triggering parameters have been detected. For example, the method may include a baseline monitoring time period that if exceeded ends the process. In some embodiments, the monitoring step may also be terminated once a quality of service improvement has been made.

Figure 5:
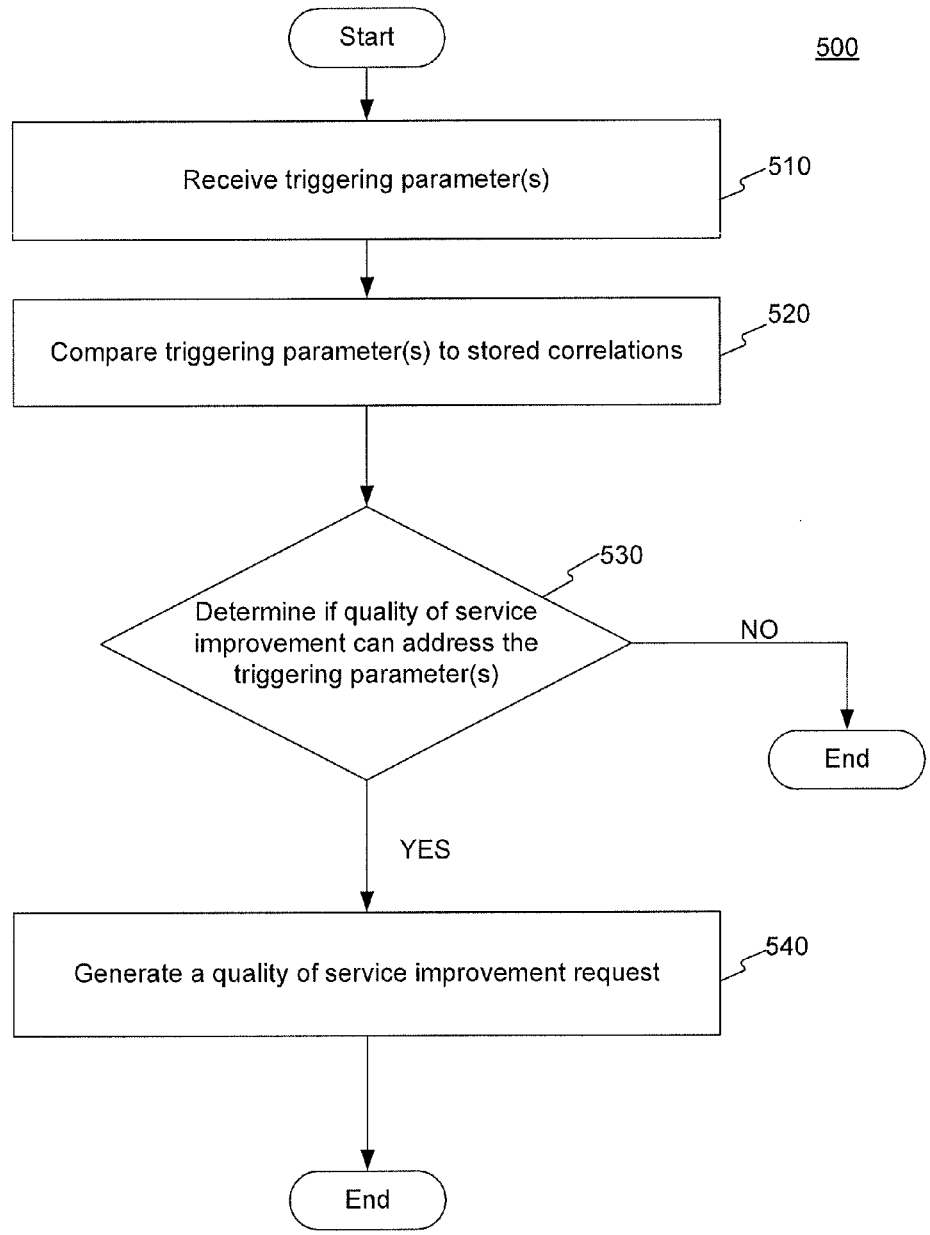
FIG. 5 is a flowchart of an example process for analyzing triggering parameters in a triggering parameter analyzer.

The triggering parameters are transmitted from the user device 120 or the communications server 105 to a triggering parameter analyzer 280, 360 (step 430). In some embodiments, the triggering parameter analyzer 280 may include an application, a program, a quality of service manager and/or another capable triggering parameter analyzer or program. The triggering parameter analyzer 280, 360 determines if a quality of service improvement is necessary from the triggering parameters. If a determination is made to improve the quality of service, a request is generated and transmitted to the communications system 100. FIG. 5, as discussed more fully below, describes the operation of the triggering parameter analyzer 280, 360 in greater detail.

The request to improve the quality of service is transmitted from the user device 120 or the communications server 105 to a communications system 100 (step 440). In some embodiments, the method 400 may continue until the end of the communications session. In other embodiments, the method 400 may terminate at the conclusion of step 440. In some embodiments, the communications system 100 may process the request and change the quality of service to reflect the request. This optional step may include adapting audio quality to improve quality of service of a communications session through a number of methods including but not limited to: increasing the resolution of the audio stream, normalizing the audio volume to minimize softer portions, selecting alternate data compression algorithms that may introduce fewer compression artifacts, performing simple dynamic compression, performing multi-band dynamics compression, performing phonetic enhancement, performing parametric equalization to enhance consonants/sibilants in the speech and improve intelligibility, or providing supplemental closed captioning in a visual interface, such as on the display of a mobile telephony device or a computer based phone client or application. The above improvement methods may be used individually or in combination with one another to achieve an increase in quality of service.

In some embodiments, quality of service improvements may involve action taken at any or all of: source devices capturing and transmitting media data streams, a central server processing and routing/relaying media data streams captured from one or more source devices, and any or all of the user devices 120 receiving media data streams. Furthermore, the quality of service improvements may be applied to media data originating from the central server, such as audio that is pre-recorded and is played back by the system/telephony service or is generated using such technologies as text-to-speech.

FIG. 5 is a flowchart of an embodiment of an analysis process 500 that, in some embodiments, operates in conjunction with method 400. As an example, an embodiment of the analysis process 500 that utilizes a quality of service manager as the triggering parameter analyzer 280, 360 will be discussed. As illustrated in FIG. 5, an analysis process, through the quality of service manager 280, 360, determines if the monitored triggering parameter necessitates a quality of service improvement by comparing the monitored triggering parameters to stored correlations of triggering parameters and quality of service improvements. In step 510, the quality of service manager 280, 360 receives the triggering parameter(s) from step 430 of method 400.

The quality of service manager 280, 360 may compare the triggering parameters to a database of stored correlations (step 520). The stored correlations may include a correlation between at least one quality of service improvement and any of the previously mentioned triggering parameters. For example, the stored correlations may include a triggering parameter that is correlated with a single quality of service improvement or multiple different quality of service improvements.

The quality of service manager 280, 360 may select a quality of service improvement based on the specific triggering parameters encountered during the communications session. For example, the quality of service manager 280, 360 compares the triggering parameter to the stored correlations. If the triggering parameter matches the triggering parameter of a stored correlation, the quality of service manager 280, 360 identifies the quality of service improvement for that stored correlation. In other words, the quality of service manager 280, 360 may determine which quality of service improvement best matches the triggering parameter that presented during the communications session. For example, the content of a user's speech might be associated with a quality of service improvement to increase the resolution of the audio stream. In operation, the communications system 100 recognizes the content of the user's speech, the triggering parameter, and provides a quality of service improvement that can increase the quality of service of the communications session. As a further example, the volume of a user's speech may be associated with two quality of service improvements to increase intelligibility, increasing the bandwidth of the communication or increasing the volume. The quality of service manager 280, 360 could apply the improvements in tandem or individually. In some embodiments, the stored correlations may be stored in the communications server 105, the database 110, the user device 120, and/or the storage device 125. Additionally, the quality of service improvements are determined while taking the specific triggering parameter into consideration. For example, the quality of service manager 280, 360 may determine that three different triggering parameters are present and tailor a quality of service improvement to those specific triggering parameters.

Further, the quality of service manager 280, 360 may associate certain quality of service improvements with specific users 130. For example, the quality of service manager 280, 360 may create a user quality of service improvement profile that is updated when any quality of service improvements are made. The user quality of service improvement profile may include information about the context of a previous quality of service improvement, such as the triggering parameter and the quality of service improvement directed to that specific triggering parameter. In this manner, the quality of service manager 280, 360 can remember and learn from previous quality of service improvements and apply those improvements automatically when the same triggering parameters occur. As a further example, the quality of service manager 280, 360 could look to multiple users 130 and determine if a pattern of behavior occurs in response to a specific context or triggering parameter. If so, the quality of service manager 280, 360 can associate a specific quality of service improvement with the pattern of behavior to increase the effectiveness of the quality of service improvements.

In some embodiments, the quality of service improvement could take place on multiple user devices 120. For example, a user device 120 could detect ambient noise that is emanating from a different user device 120 or an unrelated device. The quality of service manager 280, 360 could determine that the best quality of service improvement would be to alter the noise emanating from the different user device 120 or the unrelated device. Such a situation could arise when a user 130 is playing music on one user device 120 and making a call on a separate user device 120. By lowering the volume on the user device 120 playing music the communications session on the other user device 120 is improved. This also applies to a communications session where a first user 130 has another device in the background making excessive ambient noise. The user device 120 of a second user 130 may send a request to the other device of the first user to reduce the noise and therefore improve the intelligibility of the communications session. This type of quality of service improvement may not be possible when the user device 120 does not have connection and access to the different user device 120 or the unrelated device. When there is a lack of connection between the user device 120 and the other devices, the quality of service manager 280, 360 may determine that altering the operation of the other devices will improve quality of service of the communications session, such as by lowering the volume of the other devices, and instruct the user 130 to alter the other devices accordingly. Alternatively, the quality of service manager 280, 360 may determine that quality of service improvements on the user device 120 may compensate for actions of the other device, such as when the other device is loudly playing music, and send a request to make a quality of service improvement.

The quality of service manager 280, 360 determines if the quality of service improvement associated with the quality of service indicator can address the quality of service deficiency (step 530). The quality of service improvement can address the problem if altering the quality of service of the communications session can increase the overall quality of service delivered to the user 130. For example, this can be determined by asking users 130 if the quality of service increased after the improvement. This can also be determined by testing the quality of service improvements against quality of service of test communications sessions and then associating the best improvement with each individual triggering parameter. If the determination is "YES," then the quality of service manager 280, 360 generates a quality of service improvement request, in step 540. After step 540 method 500 ends and method 400 resumes at step 440. If the determination is "NO," then the analysis process 500 is terminated. In some embodiments, a "NO" determination would terminate both the analysis process 500 and the quality of service management method 400. In some embodiments, the quality of service management method 400 would continue to monitor for other triggering parameters even after a "NO" determination and could return to step 510 if a new triggering parameter is detected.

In the preceding description, various preferred embodiments have been described with reference to the accompanying drawings. It will, however, be evident that various modifications and changes may be made thereto, and additional embodiments may be implemented, without departing from the broader scope of the disclosure. The disclosure and drawings are accordingly to be regarded in an illustrative rather than restrictive sense.

For example, advantageous results still could be achieved if steps of the disclosed techniques were performed in a different order or if components in the disclosed systems were combined in a different manner or replaced or supplemented by other components. Therefore, it is intended that the disclosed embodiments and examples be considered as examples only.

What is claimed is:

1. A method for improving communications among devices in a system comprising at least some of the devices having one or more sensors and stored correlations reflecting user-driven indicators and quality of service improvements, the method comprising:
   monitoring, using one or more of the sensors, for information reflecting at least one user-driven indicator associated with a communications session;
   determining from the monitored information whether the user-driven indicator requires an improvement in a quality of service associated with the communications session; and
   transmitting to a communications system a request to improve the quality of service associated with the communications session based on the determination, wherein transmitting to the communications system the request to improve the quality of service associated with the communications session comprises:
   selecting a particular quality of service improvement based on the stored correlations; and
   including in the request at least one of (i) an instruction associated with the selected particular quality of service improvement or (ii) information identifying the selected particular quality of service improvement.

2. The method of claim 1, wherein the at least one or more sensors is selected from a microphone, a camera subsystem, an infrared sensor, a light sensor, a motion sensor, a proximity sensor, a touchscreen, a button, a gyroscope, a radar sensor, a pressure sensor, a biometric sensor, or a positioning system.

3. The method of claim 1, wherein the user-driven indicator comprises a user behavior.

4. The method of claim 3, wherein the user behavior comprises at least one: a proximity or a placement of the user device relative to the user, a user action with the user device, a characteristic associated with user speech, or an indicator associated with the user.

5. The method of claim 4, wherein the proximity or placement of the user device relative to the user comprises at least one of: a distance of the user device to a user, an orientation of the user device to a user, or a contact between the user device and a user.

6. The method of claim 4, wherein the user action with the user device comprises at least one of: a change in volume of the user device or a change in operation of the user device.

7. The method of claim 4, wherein the characteristic associated with user speech comprises at least one of: a content of speech, a pace of speech, a volume of speech, a period of time between speech, a repetition of speech, a playback repetition in Interactive Voice Response (IVR) or a language of speech.

8. The method of claim 4, wherein the indicator associated with the user comprises at least one of: a facial expression or a biometric parameter.

9. The method of claim 1, wherein the user-driven indicator comprises a contextual cue.

10. The method of claim 9, wherein the contextual cue comprises at least one of: an environmental parameter of the communications session, a user characteristic, a setting on the user device, or a user preference for quality of service.

11. The method of claim 10, wherein the environmental parameter comprises at least one of: an ambient audio noise level, or a geographic location of the user device.

12. The method of claim 11, wherein the geographic location of the user device further comprises:
   determining a period of time;
   searching an event calendar for the geographic location; and
   comparing the period of time and the event calendar to determine if the user device is at the geographic location during an event.

13. The method of claim 11, wherein the geographic location of the user device further comprises:
   predicting if the geographic location would create an increased cognitive load on the user.

14. The method of claim 10, wherein the setting on the user device comprises at least one of: a language setting, a volume setting, or a speakerphone setting.

15. The method of claim 1, wherein the quality of service improvements comprise at least one of: increasing the resolution of the audio stream, normalizing the audio volume to minimize softer portions, selecting alternate data compression algorithms that may introduce fewer compression artifacts, performing simple dynamic compression, performing multi-band dynamics compression, performing phonetic enhancement, performing parametric equalization to enhance consonants or sibilants in the speech and improve intelligibility, or providing supplemental closed captioning in a visual interface.

16. A user device comprising:
stored correlations reflecting user-driven indicators and quality of service improvements;
at least one or more sensors;
one or more of the sensors configured to monitor for at least one user-driven indicator associated with a communications session; and
a processor in communication with the one or more sensors and a triggering parameter analyzer, where the processor is configured to:
determine from the user-driven behavior whether an improvement in a quality of service associated with the communications session is required; and
transmit a request to improve the quality of service associated with the communications session based on the determination to a communications system, wherein transmitting to the communications system the request to improve the quality of service associated with the communications session comprises:
selecting a particular quality of service improvement based on the stored correlations; and
including in the request at least one of (i) an instruction associated with the selected particular quality of service improvement or (ii) information identifying the selected particular quality of service improvement.

17. The user device of claim 16, wherein the user-driven indicator comprises a user behavior.

18. The user device of claim 17, wherein the user behavior is a characteristic associated with user speech, the characteristic associated with user speech comprising at least one of: a content of speech, a pace of speech, a volume of speech, a period of time between speech, a repetition of speech, a playback repetition in Interactive Voice Response (IVR) or a language of speech.

19. The user device of claim 16, wherein the processor is configured to;
compare the content of a user's speech to a library of speech content; and
determine whether the content of a user's speech matches the library of speech content.

20. A non-transitory computer-readable medium encoded with instructions, which when executed by a processor, causes the processor to perform a method for improving communications, the method comprising:
monitoring, using a user device with one or more sensors, for information reflecting at least one user-driven indicator associated with a communications session;
determining, using a triggering parameter analyzer, from the monitored information whether the user-driven indicator directs an improvement in a quality of service associated with the communications session; and
transmitting a request to improve the quality of service associated with the communications session based on the determination to a communications system having stored correlations reflecting user-driven indicators and quality of service improvements, wherein transmitting to the communications system the request to improve the quality of service associated with the communications session comprises:
selecting a particular quality of service improvement based on the stored correlations; and
including in the request at least one of (i) an instruction associated with the selected particular quality of service improvement or (ii) information identifying the selected particular quality of service improvement.

\* \* \* \* \*